No. 669,381. Patented Mar. 5, 1901.
W. BUTTLER.
METHOD OF APPLYING BACKING MATERIAL TO GLASS SHEETS OR PLATES.
(Application filed Sept. 27, 1900.)
(No Model.)
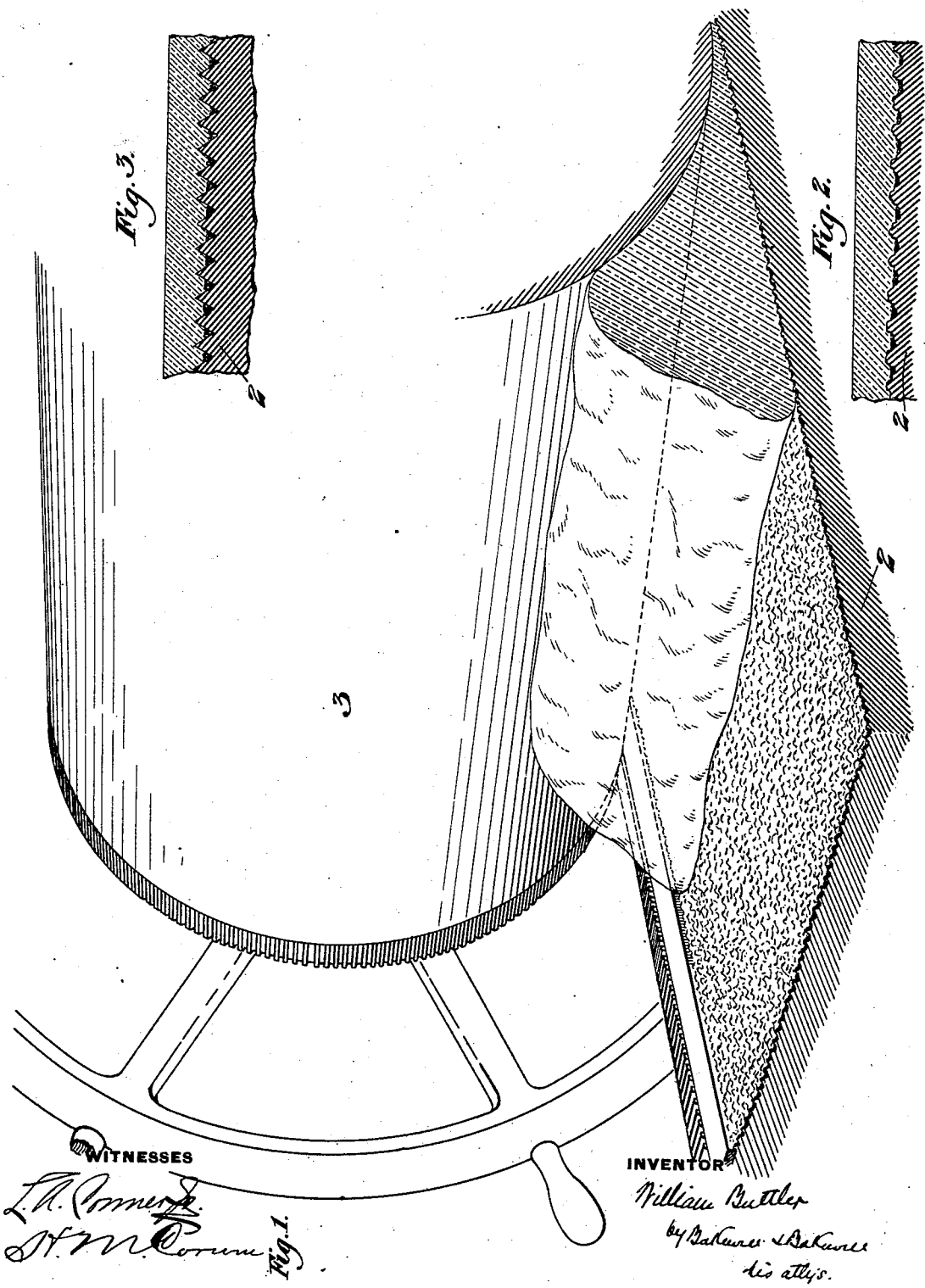

United States Patent Office.

WILLIAM BUTTLER, OF REDKEY, INDIANA.

METHOD OF APPLYING BACKING MATERIAL TO GLASS SHEETS OR PLATES.

SPECIFICATION forming part of Letters Patent No. 669,381, dated March 5, 1901.

Application filed September 27, 1900. Serial No. 31,226. (No specimens.)

*To all whom it may concern:*

Be it known that I, WILLIAM BUTTLER, of Redkey, in the county of Jay and State of Indiana, have invented a new and useful Improvement in Methods of Applying Backing Material to Glass Sheets or Plates, of which the following is a full, clear, and exact description, reference being had to the accompanying drawings, forming part of this specification, in which—

Figure 1 is a broken perspective view of rolling apparatus which may be used in carrying out my improved method, and Figs. 2 and 3 are enlarged cross-sections showing portions of the plate of different forms upon which the glass sheet may be rolled.

My invention relates to the applying of backing material—such as sand, broken glass, or other granular substance—to the surface of glass sheets or plates and is designed to provide a cheap and simple method therefor, by which the granular material shall be securely fastened to the glass.

In carrying out my invention I provide a bed-plate 2 for receiving the glass to be rolled, which plate is roughened or provided with indentations, which may be arranged in any desired manner. Thus in Figs. 1 and 2 I have shown the plate as provided with a face formed in imitation of a rock face.

In using the apparatus the sand, broken glass, or other granular material is spread over the roughened bed-plate and lies in the indentations in its face. The glass is then teemed upon the table and the roller 3 moved over it in the ordinary manner to form the plate. At the same time the workman may use the usual rake for spreading the glass in front of the roller, this rake resting on the top of the projections of the bed-plate and not engaging the sand which lies in the recesses or indentations. As the semifluid or viscid glass is rolled and spread over the bed-plate it is forced down into the indentations and particles of the sand or other material become fastened to these projecting portions of the hot glass. The glass plate is then removed in the ordinary way and is ready for cutting into plates or tiles of the desired size. Several plates may be rolled after the sand is supplied, the plates picking up successive portions of the material until it is exhausted.

The projections of the plate may be of any desired shape, and I show them in Fig. 3 as forming angular cross-ribs extending across the table.

The glass is preferably opaque and may be made in white or any desired colors.

The advantages of my invention result from the simplicity of the operation, which may be rapidly and cheaply carried out, and from the quality of the product, since it is found that the granular material is thus firmly secured as a backing to the glass.

Many changes may be made in the shape and arrangement of the indentations of the bed-plate and in the other parts of the apparatus without departing from my invention.

I claim—

1. The method of backing a glass plate consisting in forming projections on the plate and securing granular material to the said projections; substantially as described.

2. The method of forming a glass plate with a backing thereon, consisting in rolling the glass plate with projections thereon, and simultaneously securing granular material to the said projections; substantially as described.

3. As a new article of manufacture, a glass plate having its face provided with projections, and granular material secured to said projections; substantially as described.

In testimony whereof I have hereunto set my hand.

WILLIAM BUTTLER.

Witnesses:
L. A. CONNER, Jr.,
G. I. HOLDSHIP.